United States Patent Office 3,546,210
Patented Dec. 8, 1970

3,546,210
SUSTITUTED AZEPINE COMPOUNDS
Jerry E. Robertson, North Oaks Village, and Alvin C. Conway, North St. Paul Village, Minn., assignors to Minnesota Mining and Manufacturing Company, St. Paul, Minn., a corporation of Delaware
No Drawing. Filed Dec. 4, 1967, Ser. No. 687,448
Int. Cl. C07d 51/70, 53/02
U.S. Cl. 260—239                                 9 Claims

ABSTRACT OF THE DISCLOSURE

5 - {[4-(polyfluoroalkyl) - 1 - piperazinyl]lower alkyl} dibenz[b,f]azepines, the corresponding dihydrodibenz-[b,f]azepines and homopiperazinyl compounds and salts, thereof with pharmaceutically acceptable acids. These compounds possess certain actions on the central nervous system.

DETAILED DESCRIPTION

The present invention relates to 5-{[4-(polyfluoroalkyl)-1-piperazinyl]lower alkyl}dibenz[b,f]azepines, the corresponding dihydrodibenz[b,f]azepines and 1 - homopiperazinyl compounds and salts thereof with pharmaceutically acceptable acids. The aromatic carbocycles of the compounds can be substituted by halogen, trifluoromethyl, lower alkyl and lower alkoxy groups (the lower alkyl and lower alkoxy groups containing not more than four carbon atoms each) although they are preferably unsubstituted.

The preferred compounds of the invention have the formula:

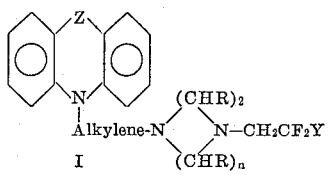

I and salts thereof with phamaceutically acceptable acids. In the foregoing formula in which Z is —CH$_2$CH$_2$— or —CH=CH—, Alkylene is an alkylene group (straight or branched chain) containing 2–6 carbon atoms provided that at least 2 carbon atoms separate the 2 nitrogen atoms, each R is hydrogen or lower alkyl (containing not more than about 4 carbon atoms), n is 2–3 and Y is fluorine or a polyfluoroalkyl group. Y contains not more than about 3 carbon atoms and more than half of the monovalent atoms therein are fluorine, the remainder (if any) usually being hydrogen. The R groups can be but need not be the same in any particular compound. Ordinarily, however, not more than 2 R groups in the same compound are lower alkyl. A useful subclass of the compounds of Formula I are those in which the R groups are hydrogen, n is 2 and Y is F. In the most preferred compounds of the invention, Alkylene is —(CH$_2$)$_3$— or

—CH$_2$CH(CH$_3$)CH$_2$— the R's are hydrogen, n is 2 and Y is fluorine.

The compounds of the invention have central nervous system depressant, anti-aggressive, anti-anxiety, anthistaminic, antiserotonin, anticholinergic, adrenolytic, hypotensive, hypothermic, anticonvulsant, skeletal muscle relaxant and motor activity depressant actions. They are sedatives without hypnotic activity and potentiate other central nervous system depressants such as ethanol and the barbituates. Some of them have anorexigenic activity. These activities have been elucidated by means of animal tests.

The new compounds of Formula I can be produced by reacting a dibenz[b,f]azepine or a 10, 11-dihydrodibenz-[b,f]azepine (II, Z is as previously defined)

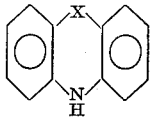

II in the presence of an acid binding agent, or reacting a metal compound of II with a compound of the formula:

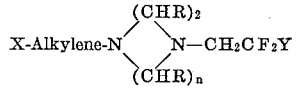

III in an inert solvent such as benzene, toluene or xylene; Alkylene, n, R and Y having the same meaning as above and X being a halide atom or reactive ester group. In Formula II above and in the following formulae the carbocycles of the dibenz[b,f]azepine and 10,11-dihydrodibenz[b,f]azepine reactants are represented as unsubstituted. If substituents (of the types previously mentioned) are desired on these rings in the final compounds, however, suitably substituted reactants should be used.

In the foregoing reactions, sodium amide, lithium amide, potassium amide, sodium, lithium and potassium, are suitable acid binding agents, the alkali metal derivatives are suitable as metal compounds of the dibenz[b,f]-azepines or 10,11-dihydrodibenz[b,f]azepines, and aryl sulphonic acid ester groups and alkali metal salts of acid sulphuric acid ester groups are suitable reactive ester groups.

The compounds of Formula I can also be produced by reacting a reactive ester of an N-hydroxyalkyldibenz[b,f]-azepine or N-hydroxyalkyl-10,11-dihydrodibenz[b,f]azepine or N - hydroxyalkyl-10,11-dihydrodibenz[b,f]azepine or a corresponding halide (IV).

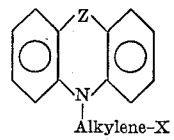

IV wherein Z, Alkylene and X are as previously defined, with an N-substituted-piperazine of the formula:

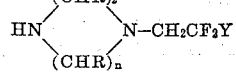

V

The reaction can take place at about 40–120° C. in an inert solvent, such as toluene, methyl ethyl ketone or an alkanol. Reactive esters or halides of Formula IV are obtained, for example, by reacting an alkali metal derivative of a compound of Formula II with reactive difunctional esters or halides including diesters (such as diesters of alkanediols), dihalides and, monoestermonohalides. Of particular use are those compounds with two different acid components such as, for example, α-bromo-γ-chloroalkanes, and aryl sulphonic acid esters of chloroalkanols.

Further, the compounds of Formula I can also be produced in the following way: A dibenz[b,f]azepine or 10,11-dihydrodibenz[b.f]azepine is reacted, possibly in the presence of an acid binding agent, or a metal compound of the dibenzazapine or dihydrodibenzazepine is reacted with phosgene. The resultant 5-chlorocarbonyl derivative is then condensed with an amino alcohol (VI)

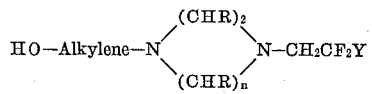

VI to form the 5-carbo-(1-piperazinyl)alkoxy derivative (VII)

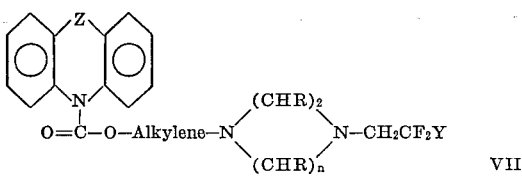

$$O=\overset{|}{\underset{|}{C}}-O-\text{Alkylene}-N \begin{array}{c} (CHR)_2 \\ \diagup \\ \diagdown \\ (CHR)_n \end{array} N-CH_2CF_2Y \qquad \text{VII}$$

This compound is then heated to eliminate carbon dioxide and form the desired compound.

In addition, compounds of Formula I can be produced by reacting a 1-piperazinylalkyl intermediate of Formula VIII

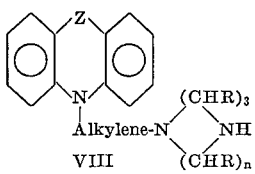

$$\text{Alkylene-N} \begin{array}{c} (CHR)_3 \\ \diagup \\ \diagdown \\ (CHR)_n \end{array} NH \qquad \text{VIII}$$

with a reactive ester of the type $R'CO_2OCH_2CF_2Y$, wherein $R'$ is desirably perfluoroalkyl or aryl.

For purposes of this invention, salts of I with pharmaceutically acceptable acids are considered equivalent to I. Some possible salts include combinations with hydrochloric acid, hydrobromic acid, sulfuric acid, sulfamic acid, phosphoric acid, methanesulfonic acid, benzenesulfonic acid, ethanedisulfonic acid, acetic acid, citric acid, malic acid, succinic acid, maleic acid, fumaric acid, tartaric acid and benzoic acid.

For many ultimate applications, the compounds of the invention are associated with other solid or liquid substances to prepare compositions suitable for use. Such additional substances can be termed extending media for physiological purposes. They differ from mere mixtures or solutions in being physiologically compatible and pharmaceutically acceptable. Thus, for treatment of mammals, aqueous solutions or suspensions in aqueous or non-aqueous, physiologically compatible suspending agents such as gum acacia or the like can be prepared. These can be administered orally, or, in suitable form, parenterally, e.g. intraveneously. Alternatively, the compounds may be administered with diluents and adjuvants, such as lactose, mannitol, corn starch, gums, stearic acid, magnesium stearate or talc as well as other tabletting aids and fillers. The compounds and carriers may be in the form of capsules, tablets, powders, sterile solutions of water or other solvents or other dosage forms.

The following examples will more fully illustrate the preparation of the compositions of the invention. All temperatures in the examples are given in degrees centigrade.

EXAMPLE 1

Preparation of 5-{3-[4-(2,2,2-trifluoroethyl)-1-piperazinyl]propyl}-10,11 - dihydrodibenz[b,f]azepine and salts thereof with hydrochloric acid, maleic acid and methanesulfonic acid.

A mixture of 4.8 g. of 10,11-dihydrodibenz[b,f]azepine and 0.97 g. of sodium amide in 100 ml. of dry toluene is heated at reflux for 2.5 hours. 1-(2,2,2-trifluoroethyl)-4-(3-chloropropyl)piperazine, 6.0 g., is then added at room temperature and heating continued for 18 hours. Filtration and concentration of the filtrate gives crude 5-{3-[4-(2,2,2-trifluoroethyl)-1-piperazinyl]propyl} - 10,11 - dihydrodibenz[b,f]azepine. It can be purified by chromatography over alumina (benzene) and forms the hydrochloride, M.P. 217–218°.

Analysis.—Calc'd for $C_{23}H_{28}N_3F_3 \cdot HCl$ (percent): C, 62.8; H, 6.6. Found (percent): C, 62.9; H, 6.7.

The free base liberated from the hydrochloride has $n_D^{23}$ 1.5533. Treatment of an ethanol solution of the free base with an equal molar amount of maleic acid and concentrating gives the maleic acid salt, M.P. 134–136°. By the addition of methanesulfonic acid to an ether solution of the free base, one can obtain a dimethanesulfonate, M.P. 153–154.5° (dec.).

The 1-(2,2,2-trifluoroethyl) - 4 - (3-chloropropyl)piperazine required above can be obtained in the following manner: 2,2,2-trifluoroethyl trifluoromethanesulfonate is prepared in benzene at room temperature from equal parts by weight of trifluoroethanol and triethylamine and excess trifluoromethansulfonyl fluoride in a closed system at 10 p.s.i. The excess amine is removed with a dilute hydrochloric acid wash. The benzene solution of the ester may be used directly or the pure ester can be isolated when methylene chloride is used as a solvent; it has B.P. 89–91°.

A refluxing solution of 258 g. of piperazine in 3 l. of benzene is treated over several hours with 348 g. of 2,2,2-trifluoroethyl trifluoromethanesulfonate and the mixture heated at reflux overnight. Piperazine salts and piperazine are removed by filtration and the filtrate distilled first at atmospheric pressure to remove benzene and then at reduced pressure. 1-(2,2,2-trifluoroethyl)piperazine is collected at 50–52° (17 mm.).

A mixture of 6.8 g. of 1-(2,2,2-trifluoroethyl)piperazine, 4.16 g. of 3-chloropropanol and 5.53 g. of potassium carbonate in 50 ml. of ethanol is heated at reflux for 18 hours. The filtrate from the resulting mixture is distilled to provide 1-(3-hydroxypropyl) - 4 - (2,2,2-trifluoroethyl) piperazine, B.P. 121–135° (8 mm.). This piperazine, 9.74 g., with 5.6 g. of thionyl chloride in 150 ml. of benzene is heated at reflux for 2 hours until gas evolution is complete. The precipitate is collected and recrystallized from ethanol-ether giving 1-(3-chloropropyl)-4-(2,2,2-trifluoroethyl)piperazine dihydrochloride, M.P. 169°. The free base, a light yellow oil, is obtained by treating an ether suspension of the hydrochloride with aqueous sodium hydroxide solution and drying and concentrating the ether. It may be used without further purification.

EXAMPLE 2

Preparation of 5-{3-[4-(2,2,2-trifluoroethyl) - 1 - piperazinyl]propyl}dibenz[b,f]azepine and the hydrochloride salt thereof.

A rapidly stirred mixture of 2.6 g. (3.3 equivalents) of sodium amide and 3.9 g. of dibenz[b,f] azepine in 75 ml. of dry xylene is heated under reflux (nitrogen atmosphere) for three hours. The dihydrochloride of 1-(3-chloropropyl-4-(2,2,2-trifluoroethyl)piperazine, 6.3 g., is then added at room temperature and the mixture heated at reflux for an additional 17 hours. After the addition of a small amount of water, the dibenzazepine derivative is extracted into 800 ml. of 6 N hydrochloric acid and liberated with ammonium hydroxide. The crude 5-{3-[4-(2,2,2-trifluoroethyl) - 1 - piperazinyl]propyl}dibenz[b,f]azepine may be purified by column chromatography over alumina or magnesium silicate. It has a M.P. 79–81° and forms a hydrochloride, M.P. 193–195° (ethanol).

Analysis.—Calc'd for $C_{23}H_{26}N_3F_3 \cdot HCl$ (percent): C, 63.1; H, 6.2; N, 9.6. Found (percent): C, 63.1; H, 6.4; N, 9.5.

EXAMPLE 3

Preparation of 5-{3-[4-(2,2,2-trifluoroethyl)-1-homopiperazinyl]propyl}-10,11-dihydrodibenz[b,f]azepine and the dihydrochloride salt thereof.

A mixture of 13. 6 g. of 5-(3-chloropropyl)-10,11-dihydrodibenz[b,f]azepine, 9.1 g. of 1-(2,2,2-trifluoroethyl) homopiperazine, and 9.8 g. of sodium iodide in 150 ml. of methyl ethyl ketone is heated at reflux for 17 hours, then after the addition of 3.5 g. of potassium carbonate, for another 7 hours. The mixture is diluted with benzene, washed with dilute sodium hydroxide, then sodium chloride solution, and extracted with 6 N hydrochliric acid. The acid extract is made alkaline, and the freed dibenzazepine derivative taken up in benzene, washed, dried and concentrated to give 5 - {3 - [4 - (2,2,2-trifluoroethyl)-1-homopiperazinyl]propyl} - 10,11 - dihydrodibenz[b,f]azepine as an oil. It can be purified by chromatography over magnesium silicate and forms a dihydrochloride with one ethanol of crystallization, M.P. 103–107° (dec.; from ethanol).

*Analysis.*—Calc'd for $C_{24}H_{30}N_3F_3 \cdot 2HCl \cdot CH_3CH_2OH$ (percent): C, 58.2; H, 7.1; N, 7.8; Cl, 13.2. Found (percent): C, 57.9; H, 6.7; N, 8.4; Cl, 12.9.

1-(2,2,2-trifluoroethyl)homopiperazine and the other required trifluoroethyl piperazine derivatives may be obtained by the method described for 1-(2,2,2-trifluoroethyl)piperazine substituting the appropriate piperazine derivative for piperazine.

EXAMPLE 4

Preparation of 5-{2-methyl-3-[4-(2,2,2-trifluoroethyl)-1-piperazinyl]propyl}dibenz[b,f]azepine and the hydrochloride salt thereof.

A solution of 3.9 g. of dibenz[b,f]azepine in 80 ml. of dry xylene is treated with 0.9 g. of sodium amide and heated at reflux for 3 hours. 2-(3-chloro-2-methylpropyl)-4-(2,2,2-trifluoroethyl)piperazine (5.15 g.) is added and heating continued for 16 hours. The cooled mixture is treated with 500 ml. of water and 300 ml. of conc. hydrochloric acid, and the aqueous phase separated and made alkaline with conc. ammonium hydroxide. The oil obtained on extraction with ether and concentrating is chromatographed over neutral alumina (ether:petroleum ether, 3:1) to give 5-{2-methyl-3-[4-(2,2,2-trifluoroethyl)-1-piperazinyl]propyl}dibenz[b,f]azepine as the free base. It may be further purified as the hydrochloride, M.P. 215.5–217° (acetone-ether).

*Analysis.*—Calc'd for $C_{24}H_{28}F_3H_3 \cdot HCl$ (percent): C, 63.8; H, 6.5; N, 9.3. Found (percent): C, 63.7; H, 6.3; N, 9.1.

The 1-(3-chloro-2-methylpropyl)-4-(2,2,2-trifluoroethyl)piperazine used above may be obtained by stirring together 50.0 g. of 1-bromo-3-chloro-2-methylpropane, 24.4 g. of 1-(2,2,2-trifluoroethyl)piperazine and 30.8 g. of sodium carbonate in 300 ml. of acetone for two days at room temperature. The mixture is filtered and distilled to give the required chloropropylpiperazine, B.P. 69–71° (0.5 mm.).

EXAMPLE 5

Preparation of the hydrochloride salt of 5-{2-methyl-3-[4-(2,2,2-trifluoroethyl)-1-piperazinyl]propyl}-10,11-dihydrodibenz[b,f]azepine.

Following the procedure of Example 4, but substituting 3.9 g. of 10,11-dihydrodibenz[b,f]azepine for the dibenz[b,f]azepine, one obtains 5-{2-methyl-3-[4-(2,2,2-trifluoroethyl)-1-piperazinyl]propyl}-10,11-dihydrodibenz[b,f]azepine hydrochloride, M.P. 203–205° (isopropanol).

*Analysis.*—Calc'd for $C_{24}H_{30}F_3N_3 \cdot HCl$ (percent): C, 63.5; H, 6.9; N, 9.3. Found (percent): C, 63.5; H, 6.9; N, 9.1.

EXAMPLE 6

Preparation of 5-{3-[4-(2,2,3,3-tetrafluoropropyl)-1-piperazinyl]propyl}-10,11-dihydrodibenz[b,f]azepine and the hydrochloride salt thereof.

A mixture of 13.6 g. of 5-(3-chloropropyl)-10,11-dihydrodibenz[b,f]azepine, 10.0 g. of 1,(2,2,3,3-tetrafluoropropyl)piperazine and 9.7 g. of sodium iodide in 150 ml. of methyl ethyl ketone is heated under reflux for 35 hours. Benzene and 10% sodium hydroxide are added and the organic phase then washed with sodium chloride solution and extracted with 6 N hydrochloric acid. The acid solution is made strongly alkaline and the liberated amine taken up in benzene. Chromatography over magnesium silicate gives 5-{3-[4-(2,2,3,3-tetrafluoropropyl)-1-piperazinyl]propyl}-10,11-dihydrodibenz[b,f]azepine as an oil. It may be further purified through the hydrochloride, M.P. 209–211° (ethanol).

*Analysis.*—Calc'd for $C_{24}H_{29}N_3F_4 \cdot HCl$ (percent): C, 61.1; H, 6.4. Found (percent): C, 61.2; H, 6.5.

The required piperazine can be prepared in the following manner: A solution of 130 g. of piperazine in 600 ml. of refluxing benzene is treated dropwise with 2,2,3,3-tetrafluoropropyl trifluoromethanesulfonate over about 8 hours. Heating is continued for 16 hours. The mixture is filtered and the benzene removed by distillation. The residue is then distilled under reduced pressure to give 1-(2,2,3,3-tetrafluoropropyl)piperazine, B.P. 38–40° (3 mm.), $n_D^{24}$ 1.4068. Tetrafluoropropyl trifluoromethanesulfonate can be prepared in the same manner as the trifluoroethyl ester. It has B.P. 123–124°, $n_D^{27}$ 1.3200.

EXAMPLE 7

Preparation of 5-{3-[2,5-dimethyl-4-(2,2,2-trifluoroethyl)-1-piperazinyl]propyl}-10,11-dihydrodibenz[b,f]azepine and the dihydrochloride thereof.

A mixture of 7.2 g. of 5-(3-chloropropyl)-10,11-dihydrodibenz[b,f]azepine, 5.2 g. of 2,5-dimethyl-1-(2,2,2-trifluoroethyl)piperazine and 5.2 g. of sodium iodide is heated at reflux for 17 hours, then with 1.8 g. of potassium carbonate added, heated for another 17 hours. Following the procedure of Example 6 and chromatography over magnesium silicate (elution with benzene-ether 1:1) gives 5-{3-[2,5-dimethyl-4-(2,2,2-trifluoroethyl)-1-piperazinyl]propyl}-10,11-dihydrodibenz[b,f]azepine. The dihydrochloride has M.P. 195–200° (ethanol-ether).

*Analysis.*—Calc'd for $C_{25}H_{32}N_3F_3 \cdot 2HCl$ (percent): C, 59.5; H, 6.8. Found (percent): C, 59.8; H, 7.1.

EXAMPLE 8

Preparation of 5-{3-[2-methyl-4-(2,2,2-trifluoroethyl)-1-piperazinyl]propyl}-10,11-dihydrodibenz[b,f]azepine and the hydrochloride thereof.

Using 3-methyl-1-(2,2,2-trifluoroethyl)piperazine in place of 2,5-dimethyl-1-(2,2,2-trifluoroethyl)piperazine one obtains 5-{3-[2-methyl-4-(2,2,2-trifluoroethyl)-1-piperazinyl]propyl}-10,11-dihydrodibenz[b,f]azepine. The hydrochloride of the latter has M.P. 214–215°.

*Analysis.*—Calc'd for $C_{24}H_{30}N_3F_3 \cdot HCl$ (percent): C, 63.59; H, 6.98. Found (percent): C, 63.3; H, 6.8.

EXAMPLE 9

Preparation of 5-{3-[4-(2,2,3,3,4,4,4-heptafluorobutyl)-1-piperazinyl]propyl}dibenz[b,f]azepine and the hydrochloride thereof.

A mixture of 5.10 g. of 5-(3-chloropropyl)dibenz[b,f]azepine, 5.00 g. of 1-(2,2,3,3,4,4,4-heptafluorobutyl)piperazine, and 3.74 g. of sodium iodide in 50 ml. of methyl ethyl ketone is heated under reflux for 16 hrs. Following this, 2.6 g. of potassium carbonate is added and heating continued for 72 hours. The 5-{3-[4-(2,2,3,3,4,4,-heptafluorobutyl)-1-piperazinyl]propyl}dibenz[b,f]azepine obtained is chromatographed and the hydrochloride recrystallized from acetone-ether and then ethanolether. After a further recrystallization, it has a melting point of 129–132°.

*Analysis.*—Calc'd for $C_{25}H_{26}F_7N_3 \cdot HCl \cdot H_2O$ (percent): C, 54.0; H, 5.3; N, 7.6. Found (percent): C, 53.6; H, 5.1; N, 7.6.

1-(2,2,3,3,4,4,4-heptafluorobutyl)piperazine can be prepared from piperazine, 2,2,3,3,4,4,4-heptafluorobutanol and trifluoromethanesulfonyl fluoride in a manner analogous to that shown in Example 1 for the preparation of 1-(2,2,2-trifluoroethyl)piperazine.

EXAMPLE 10

Preparation of 5-{3-[4-(1-methyl-2,2,2-trifluoroethyl)-1-piperazinyl]propyl}dibenz[b,f]azepine and the hydrochloride monohydrate thereof.

Following the procedure of Example 9, but substituting 1-(1-methyl-2,2,2-trifluoroethyl)piperazine for heptafluorobutylpiperazine one obtains 5-{3-(4-(1-methyl-2,2,2-trifluoroethyl)-1-piperazinyl]propyl}dibenz[b,f]azepine hydrochloride monohydrate, M.P. 168–170°.

*Analysis.*—Calc'd for $C_{24}H_{28}N_3F_3 \cdot HCl \cdot H_2O$ (percent): C, 61.3; H, 6.6; N, 8.9. Found (percent): C, 61.7; H, 6.3; N, 9.0.

1 - (1 - methyl - 2,2,2 - trifluoroethyl)piperazine can be prepared from piperazine, 1,1,1 - trifluoroisopropanol and trifluoromethanesulfonyl fluoride in a manner analogous to that shown in Example 1 for the preparation of 1 - (2,2,2 - trifluoroethyl)piperazine.

What is claimed is:

1. A compound of the formula:

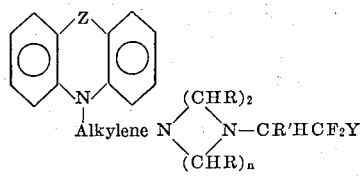

wherein Z is —CH$_2$CH$_2$— or —CH=CH—, alkylene is an alkylene group containing 2 to 6 carbon atoms, provided that at least 2 carbon atoms separate the 2 nitrogen atoms, each R is hydrogen or lower alkyl, $n$ is 2–3, R' is hydrogen or methyl and Y is fluorine or a polyfluoroalkyl group containing up to 3 carbon atoms inclusive and salts thereof with pharmaceutically acceptable acids.

2. A compound according to claim 1 in which Z is —CH$_2$CH$_2$—.

3. A compound according to claim 1 in which Z is —CH=CH—.

4. A compound of the formula:

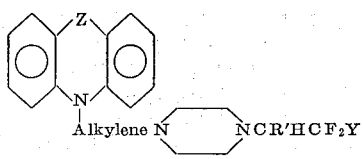

wherein Z is —CH$_2$CH$_2$ or —CH=CH—, Alkylene is an alkylene group containing 2 to 6 carbon atoms, provided that at least 2 carbon atoms separate the 2 nitrogen atoms, R' is hydrogen or methyl and Y is fluorine or a polyfluoroalkyl group containing up to 3 carbon atoms inclusive and salts thereof with pharmaceutically acceptable acids.

5. 5 - {3 - [4 - (2,2,2 - trifluoroethyl) - 1 - piperazinyl]propyl}-10,11-dihydrodibenz[b,f]azepine.

6. 5 - {3 - [4 - (2,2,2 - trifluoroethyl) - 1 - piperazinyl]propyl}dibenz[b,f]azepine.

7. 5 - {2 - methyl - 3 - [4 - (2,2,2 - trifluoroethyl)-1-piperazinyl]propyl}-10,11-dihydrodibenz[b,f]azepine.

8. 5 - {2 - methyl - 3 - [4 - (2,2,2 - trifluoroethyl)-1-piperazinyl]propyl}-dibenz[b,f]azepine.

9. 5 - {3 - [4 - (2,2,2 - trifluoroethyl) - 1 - homopiperazinyl]propyl}-10,11-dihydrodibenz[b,f]azepine.

References Cited

FOREIGN PATENTS 228,794    8/1963    Austria _____ 260—239

ALTON D. ROLLINS, Primary Examiner

U.S. Cl. X.R.

260—268; 424—244, 250